(12) United States Patent
Reigneau et al.

(10) Patent No.: US 8,982,052 B2
(45) Date of Patent: Mar. 17, 2015

(54) OPTICAL NAVIGATION DEVICES

(75) Inventors: Mathieu Reigneau, Amilly (FR); Colin Campbell, Edinburgh (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 823 days.

(21) Appl. No.: 12/987,739

(22) Filed: Jan. 10, 2011

(65) Prior Publication Data

US 2011/0169739 A1    Jul. 14, 2011

(30) Foreign Application Priority Data

Jan. 11, 2010 (GB) .................................. 1000349.9

(51) Int. Cl.
*G06F 3/033* (2013.01)
*G06F 3/042* (2006.01)

(52) U.S. Cl.
CPC ...................................... *G06F 3/042* (2013.01)
USPC .......................................... 345/166; 345/163

(58) Field of Classification Search
CPC . G06F 3/0312; G06F 3/0317; G06F 3/03549; G06F 3/042
USPC .................................................. 345/166, 163
See application file for complete search history.

(56) References Cited

U.S. PATENT DOCUMENTS

| 7,119,792 | B1 * | 10/2006 | Andre et al. | 345/163 |
| 2002/0030669 | A1 | 3/2002 | Funakoshi | 345/175 |
| 2006/0144934 | A1 | 7/2006 | Fletcher et al. | 235/383 |
| 2009/0267899 | A1 * | 10/2009 | Jeong et al. | 345/166 |
| 2009/0295718 | A1 * | 12/2009 | Cheah et al. | 345/158 |
| 2010/0302159 | A1 | 12/2010 | Findlay et al. | 345/166 |

FOREIGN PATENT DOCUMENTS

GB    0908900.4    5/2009   ............. G06F 3/033

* cited by examiner

*Primary Examiner* — Amare Mengistu
*Assistant Examiner* — Shawna Stepp Jones
(74) *Attorney, Agent, or Firm* — Allen, Dyer, Doppelt, Milbrath & Gilchrist, P.A.

(57) ABSTRACT

An assembly is adapted for being employed in an optical navigation device, such as that used on a computer or mobile communications device. The assembly includes a housing device and an optical device, wherein the housing device includes a receiving section for receiving the optical device. The receiving section has a first and a second opening. The housing device has first and second vertical registration features for aligning the optical device with the housing device. The first and second vertical registration features are spatially associated with the first and second opening respectively.

50 Claims, 3 Drawing Sheets

OPTICAL NAVIGATION DEVICES

FIELD OF THE INVENTION

The present invention relates to improvements in or relating to optical navigation devices, particularly, but not exclusively, with respect to miniature devices for use in a variety of different applications.

BACKGROUND OF THE INVENTION

Current mobile or computer devices use a variety of different navigation mechanisms. Some of these present a mousing surface for direct manipulation by a finger (or other part of the body), and work by producing images of the finger as it moves on the mousing surface, translating this finger movement to movement of a cursor (for example) on a screen. In this respect, a navigation device of this type works in a similar fashion to an optical mouse, and is referred to as an optical navigation device.

Great Britain Application Number 0908900.4 discloses an optical navigation device comprising a main housing element and an optical transmission element, wherein the optical transmission element comprises an alignment shaft which, when assembling the optical transmission element and the main housing element to a base, is operable to align the optical transmission element to the base.

However, it has become apparent that optical components generally are helped by an extreme accuracy on their alignment in order to improve their efficiency. Accurate positioning is even more critical for very small optical components or devices as further parameters such as dust and dimensional accuracy of supporting structure, such as a housing element or device should be considered. In an optical navigation device comprising an assembly wherein an optical device and a housing device are glued together or clipped together, there remains an imprecision with respect to the position of the optical device which is basically due to cleanliness of the coincident surfaces, how the glue is dispersed on the surface (s), a dimensional accuracy of manufacture of the relevant parts to be combined, etc.

SUMMARY OF THE INVENTION

It is an object of the invention to address remaining issues with respect to accurate positioning of an optical device in an assembly comprising such device. It is furthermore an object to propose methods for facilitating such accurate positioning.

According to one aspect, there is an assembly comprising a housing device and an optical device. The housing device comprises a receiving section for receiving the optical device, and the receiving section comprises a first and a second opening. The housing device also includes first and second vertical registration features for aligning the optical device with the housing device, and the first and second vertical registration features are spatially associated with the first and second opening respectively.

In the housing device, or an assembly including the housing device, each or every first vertical registration feature can be an elevation from a receiving surface of the receiving section. Beneficially, such elevation is the optical device's contact point with the housing device on the side of the first opening. Keeping in mind that dust or the like can result in a film or layer on a flat extended surface, such as in GB0908900.4, and could cause suboptimal alignment of the optical device, the limited surface area of the elevation may ease accurate positioning of the optical device.

In the housing device, or an assembly including the housing device, the receiving surface is preferably a flat surface, allowing the optical device which also has a flat or convex exterior surface (mousing surface) to be manufactured as a compact component, for example a moulded single-piece plastic element. The second registration feature is preferably a recess defined in the second opening, wherein the second registration feature receives a portion of the optical device which defines a reference position of the optics, i.e. optical device, illumination device and sensor device, which is why it should preferably be accurately positioned. On account of the second registration feature being a recess in the second opening and on account of the second registration feature receiving a portion of the optical device, the portion being a protrusion from the main body of the optical device, the second registration feature not only functions to provide vertical alignment of the optical device but at the same time provides horizontal alignment of the optical device, too. Preferably, the second registration feature receives the relevant protrusion from the optical device, or a part thereof, with positive locking (form-fit). More preferably, the second registration feature and/or the second opening is shaped for receiving the relevant protrusion from the optical device, or a part thereof, in a form-fitting manner.

The housing device preferably comprises a glue well. The glue well allows for the application of an adhesive. The adhesive is helpful for bonding the optical device to the housing device when the optical device is in contact with the registration features, wherein the contact with the registration features provides for accurate positioning and wherein the adhesive provides for this positioning to be long lasting.

In some embodiments, the glue well and each, or every first vertical registration feature are spaced apart from each other in the receiving section. The glue well and the registration features, are spaced apart from each other to help mitigate the chances of the relevant adhesive (glue) from soiling or adding impurities to one or more of the registration features. Avoiding such impurities is helpful as even a fraction of adhesive on the top surface of such registration feature may result in suboptimal alignment of the optical device. In the unlikely event that adhesive does leak from the glue well, a second aspect of the implementation of the first registration feature as an elevation from the receiving surface of the receiving section will come into effect, and therefore leaked adhesive may first coat portions of the receiving surface and may not normally reach the level of an elevation making up the registration feature.

In the housing device or an assembly including the housing device, the glue well is preferably elevated from a receiving surface of the receiving section. This results in an increased distance between the adhesive and the registration features, wherein the increased distance results in even more enhanced chance that the adhesive, in the unlikely event of the same leaking from the glue well, may not soil or impurify the registration feature(s).

The glue well may extend circumferentially around the receiving surface of the receiving section. Such circumferential glue well allows for an even distribution of the relevant adhesive along an outer contour of the optical device. The optical device being bonded by the relevant adhesive to the housing element along its outer contour, or at least along significant segments of its outer contour, provides for an even distribution of the holding force exerted by the relevant adhesive. The glue well can extend circumferentially around the receiving surface in a continuous or discontinuous manner. When the glue well is discontinuous, the relevant glue well portions are preferably distributed evenly along the outer contour of the receiving section.

The glue well may be U-shaped in cross-section (shaped as a groove or trough). Such shape provides a way to retain the relevant adhesive in the glue well and as such helps reduce the chance of the adhesive leaking off the glue well.

Preferably, when the housing device and the optical device are combined for establishing the aforementioned assembly, the first opening of the housing device receives an optical aperture of the optical device and the second opening of the housing device receives an aperture stop of the optical device. The housing device then functions as a separation of the optical part of the assembly, i.e. the optical device, on the one hand and the relevant electronics on the other hand. The electronics are disposed "under" the housing device, and the first and second opening and the optical aperture and aperture stop extending therein allows for the optical device to be accessed by the electronic, e.g. for illumination or sensing.

Both the optical aperture and the aperture stop are preferably implemented as protrusions extending from a main body of the optical device, and are adapted for extending into the first and second opening of the housing device. This allows for a compact design of the optical device as well as the separation of the optical part and the electronics part of the assembly as mentioned above, wherein the protrusions extending into the relevant openings facilitates them being accessed for illumination or sensing.

Optical surfaces of both the optical aperture and the aperture stop are preferably provided at an end portion of the relevant protrusion. Providing optical surfaces at an end portion of the relevant protrusion further facilitates them being accessed for illumination or sensing. Furthermore, such positioning of the optical surfaces allows greater freedom with respect to positioning and/or orientating the illumination and/or sensing circuitry.

Manufacture of the housing device and assembly of the housing device and the optical device is facilitated when the housing device is formed in one piece, for example by injection die moulding. Preferably, the housing device features an illumination recess and a sensing recess for receiving illumination and sensing circuits respectively. Both the aforementioned first and second opening extend into the housing device from the illumination and sensing recess provided in the housing device, thus allowing radiance originating from the illumination circuits to enter the optical device on the one hand and to leave the same optical device for being sensed by the sensing circuitry on the other hand. The optical device and the electronics, i.e. illumination circuitry and sensing circuitry, are thus securely spaced apart with the electronics being protected in the housing device and the relevant recesses and with the optical device forming a surface for user interaction.

A further aspect is a housing adapted for being utilized as the housing device described herein. Another aspect is an optical element adapted for being utilized as the optical device described herein.

According to a further aspect is an optical navigation device comprising the assembly described herein. According to still another aspect, there is a navigation device for use in a computer apparatus or a portable communications apparatus incorporating the assembly or the housing device and the optical device herein described.

According to a still further aspect, there is a computer apparatus, portable communications apparatus, or a remote control handset apparatus incorporating the navigation device herein described. A computer apparatus may incorporate the navigation device herein described, wherein the term "computer apparatus" is to be construed as including at least: mobile telephones, mobile media players, such as MP3 players, TV/DVD remote control, SatNav systems, digital cameras, etc.

According to an even still further aspect of the invention there is provided a method for assembling the optical navigation device, comprising combining the housing device and the optical device and applying an adhesive to the glue well either before, during, or following the combination.

DETAILED DESCRIPTION OF THE PREFERRED EMBODIMENT

In the following description, for purposes of explanation and not limitation, specific details are set forth, such as particular embodiments, in order to provide a thorough understanding of the present invention. However, it will be apparent to one skilled in the art that the present invention may be practiced in other embodiments that depart from these specific details. In other instances, detailed descriptions of well-known methods are omitted so as not to obscure the description of the present invention with unnecessary detail.

The present invention relates to an optical navigation device module for use in an electrical device. The electrical device may be of any appropriate type and may include mobile phones, PDAs, Laptop computers, TV remotes, games controls and other such devices.

Figure 1:
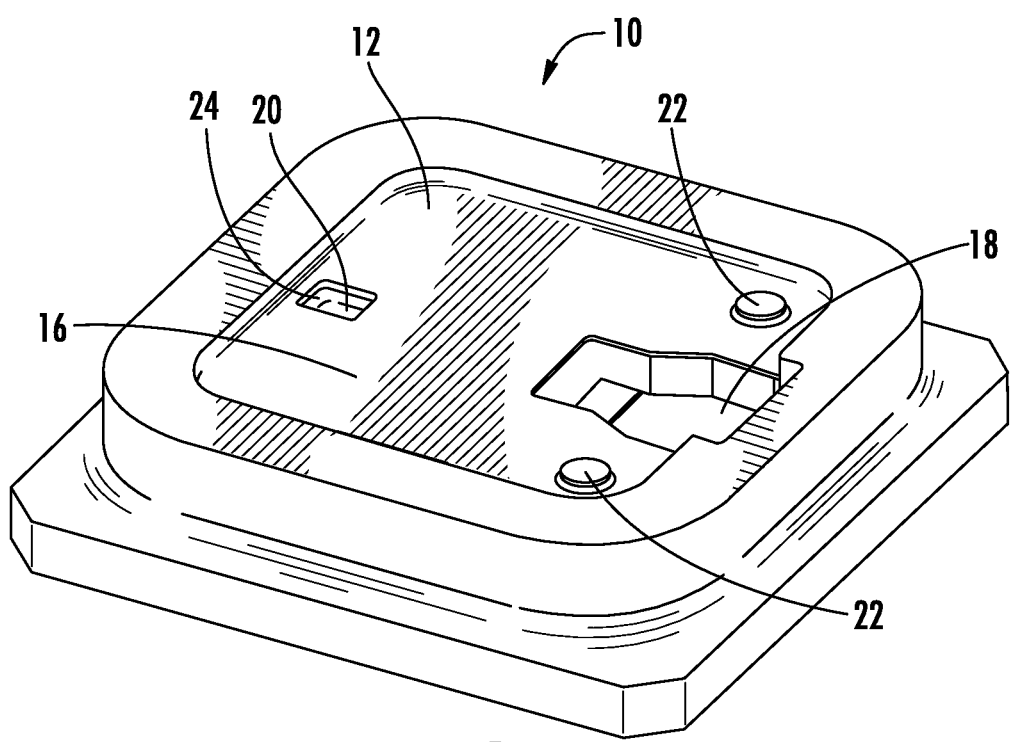
FIG. 1 is a perspective view of a housing device adapted for being utilized in the assembly of the present invention.
Figure 2:
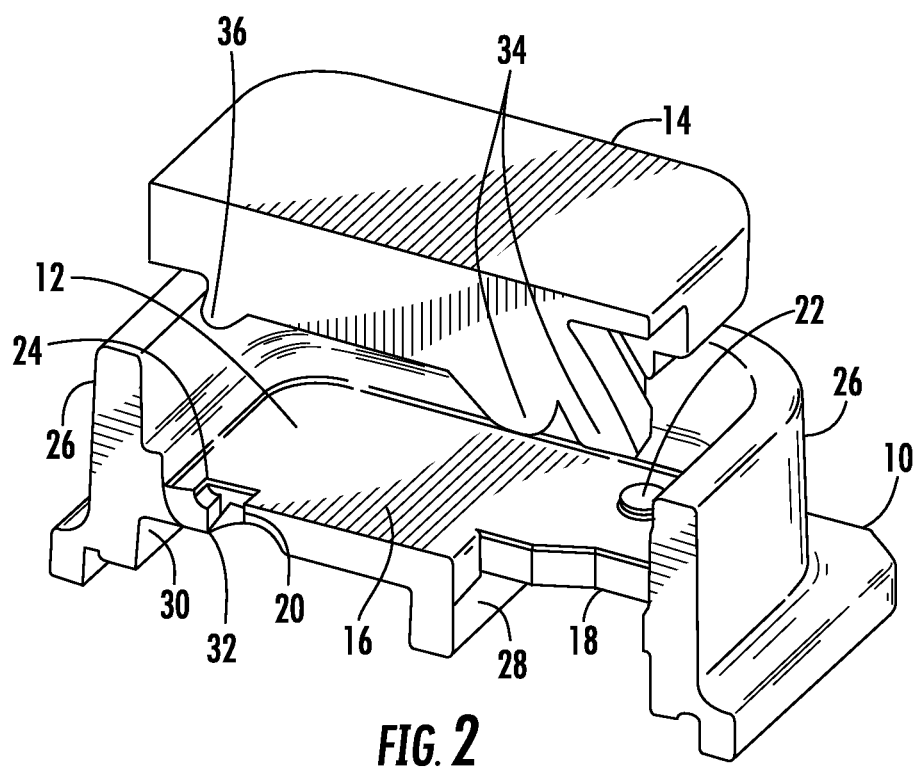
FIG. 2 is a perspective sectional view of a housing device and an optical device, wherein the optical device is shown while being combined with the housing device, and wherein the combination of housing device and optical device comprises the assembly described herein, according to the present invention.
Figure 3:
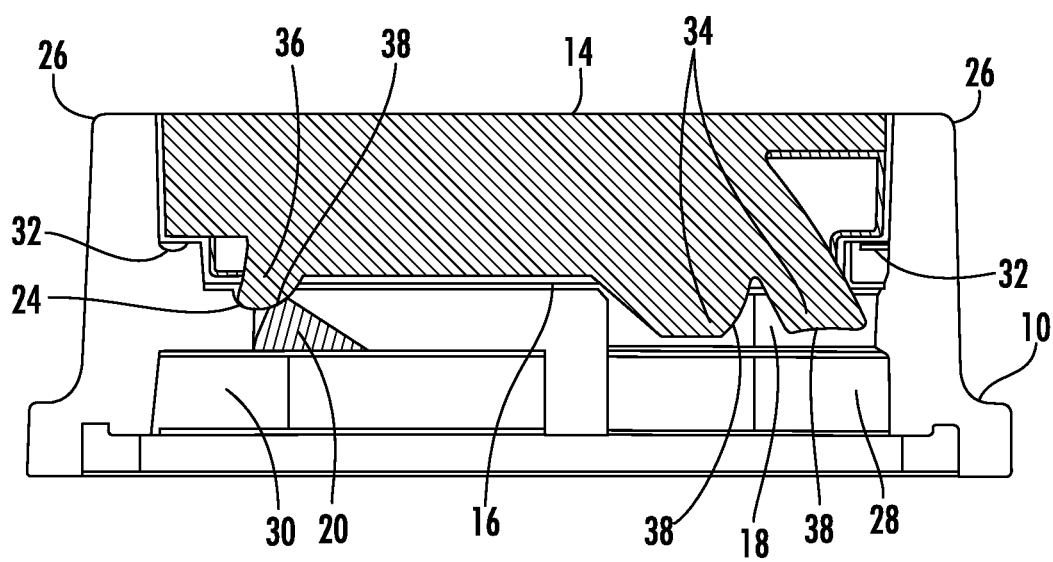
FIG. 3 is a sectional side view of an assembly comprising the housing device and the optical device, according to the present invention.

FIG. 1 is a perspective view of a housing device 10 adapted for being utilized in the assembly described herein. The housing device 10 comprises a receiving section 12. The receiving section 12 is for receiving an optical device 14 (FIG. 2, FIG. 3). The receiving section comprises a flat receiving surface 16. The receiving section 12 comprises a first opening 18 and a second opening 20. The receiving section 12 further comprises a first vertical registration or alignment feature 22 and a second vertical registration or alignment feature 24.

As can be seen from the embodiment in FIG. 1, the first and second vertical registration features 22, 24 are spatially associated with the first and second opening 18, 20 respectively. The first registration feature 22 is formed by a first and a second elevation from the receiving surface 16 of the receiving section 12. The first registration feature 22 is spatially associated with the first opening 18 in that the two aforementioned elevations are provided on opposite sides of the first opening 18, neighboring the first opening 18. The second registration feature 24 is spatially associated with the second opening 20 in that the second registration feature 24 is a recess in the second opening 20. The second registration feature 24 receives a portion of the optical device 14 which defines a reference position of the optics, i.e. optical device, illumination device and sensor device, which is why it is desirable for it to be accurately positioned.

FIG. 2 is a sectional, perspective view of a housing device 10 and an optical device 14, wherein the optical device 14 is shown while being combined with the housing device 10. As can be seen from FIG. 2, the housing device 10 comprises a circumferential wall 26. The wall 26 follows an outer contour of the receiving surface 16 and the receiving surface 16 together with the wall 26 form the receiving section 12. The wall 26 has been omitted in FIG. 1 so as not to obscure details on the receiving surface 16.

As can be seen in the sectional view in FIG. 2, the housing device 10 comprises an illumination recess 28 for receiving illumination circuitry, such as an LED (not shown), and a sensing recess 30 for receiving sensing circuitry, such as an optical sensor (not shown). Both the first and second opening 18, 20 extend into the housing device 10 from the illumination and sensing recess 28, 30. The openings 18, 20 thus allow radiance originating from the illumination circuitry to enter the optical device 14 on the one hand and to leave the same optical device 14 for being sensed by the sensing circuitry on the other hand.

As can further be seen from FIG. 2, the housing device 10 comprises a glue well 32. The glue well 32 runs along an inner surface of the wall 26, and the inner surface faces the receiving section 12. The glue well 32 is elevated from a receiving surface 16 of the receiving section 12. The glue well 32 extends circumferentially around the receiving surface 16 of the receiving section 12. The glue well 32 is U-shaped in cross-section and thus forms a groove or trough and is provided for receiving an adhesive (not shown) for bonding the housing device 10 and the optical device 14 together.

While the vertical registration features 22, 24 are provided for allowing an accurate positioning of the optical device 14, the glue well and the adhesive applied therein are provided for making the accurate positioning of the optical device 14 long lasting. Glue well 32 and registration features 22, 24 are therefore spaced apart from each other in the receiving section, as can best be seen in the sectional, perspective view in FIG. 2. The glue well 32 being elevated from the receiving surface 16 adds to the effective distance between the adhesive and any one of the registration feature(s) 22, 24. The distance between adhesive and the registration features 22, 24 is helpful in case adhesive leaks off the glue well 32. Such leaking adhesive may first coat portions of the wall 26 and possibly portions of the receiving surface 16. However, leaking adhesive may normally not reach any one of the registration feature(s) 22, 24. Soiling or impurification of the registration features 22, 24 from leaking adhesive is thus reduced or even prevented through the shape and the geometry of the housing device and the positioning of the registration features 22, 24 therein/thereon.

FIG. 3 is a sectional side view of an assembly comprising the housing device 10 and the optical device 14. The assembly is formed by inserting the optical device 14 into the receiving section 12 of the housing device 10. Mechanical contact between optical device 14 and housing device 10 is established by the optical device 14 contacting the registration features 22, 24 as shown by the vertical arrows in FIG. 2, pointing to the registration features 22, 24.

The geometry of the optical device 14 is adapted for a substantially optimal optical path inside the optical device 14. A bottom portion of the optical device 14 therefore comprises an optical aperture 34 and an aperture stop 36. These are implemented as protrusions extending from a main body of the optical device 14. These protrusions are adapted for extending into the first and second opening 18, 20 of the housing device 10 when the optical device 14 is combined with the housing device 14. The optical path inside the optical device 14 is described in more detail in co-pending application number GB1000349.9, incorporated herein by reference.

When the combination of optical device 14 and housing device 10 illustrated in FIG. 2 is completed, the position of the optical device 14 in the receiving section 12 of the housing device 10 is as shown in FIG. 3. The first opening 18 of the housing device 10 receives the optical aperture 34 of the optical device 14, and the second opening 20 receives the aperture stop 36 of the optical device 14. Optical surfaces 38 of both the optical aperture 34 and the aperture stop 36 are provided at an end portion of the relevant protrusion. The location of the optical surface 38 of the aperture stop 36 at an end portion thereof results in the optical surface 38 being in close proximity to the second registration feature 24. Close proximity of these entities, and preferably the optical surface 38 of the aperture stop 36 is as closely located near the second registration feature 24 as possible, allows for accurate positioning. Mechanical contact between optical device 14 and housing device 10 is in three points (or surface areas), namely the two elevations of the first registration feature 22 and the recess in the second opening 20 forming the second registration feature 24. The optical device 14 remains above the glue well 32 and contact here is established by an adhesive applied into the glue well 32.

As shown in the Figures, the housing device 10 and/or the optical device 14 can be provided as one piece part(s). A preferred method for manufacture is injection moulding or the like. Not shown in the drawings but apparent to anyone skilled in the art is the incorporation of the assembly (the combination of housing device 10 and optical device 14) into an electrical device, such as a computer apparatus, a portable communications apparatus, a remote control handset apparatus, et cetera. When applied to any such electrical device, powered and supplied the assembly functions as an optical navigation device, wherein a top surface of the optical device forms a mousing surface.

For being incorporated into any such electrical device, the assembly is complemented with illumination circuitry, i.e. a radiation source capable of producing a beam of radiation, housed in the illumination recess 28, and sensing circuitry, i.e. a sensor for receiving an image, housed in the sensing recess 30. The assembly thus complemented, forms an optical navigation device, capable of identifying movement of an elastic object, such as a user's finger, on the exterior or mousing surface of the optical device 14 to thereby enable a control action to be carried out.

The above embodiments are for illustration only and other embodiments and variations are possible and envisaged without departing from the spirit and scope of the invention. For example the actual type of optical navigation device is not relevant so long as it is of a type where the mousing surface is designed to be manipulated directly by finger, hand or other part of the body, or any suitably elastic implement or tool, such that intensity picked up by the mousing surface is dependent on the pressure applied.

Although a preferred embodiment of the invention has been illustrated and described herein, it is recognized that changes and variations may be made without departing from the invention as set forth in the claims. In brief, the embodiments can be summarized as proposing an assembly, adapted for being employed in an optical navigation device, such as that used on a computer or mobile communications device, the assembly comprises a housing device 10 and an optical device 14, wherein the housing device 10 comprises a receiving section 12 for receiving the optical device 14, wherein the receiving section 12 comprises a first and a second opening 18, 20, wherein the housing device 10 comprises first and second vertical registration features 22, 24 for aligning the optical device 14 with the housing device 10, and wherein the first and second vertical registration features 22, 24 are spatially associated with the first and second opening 18, 20 respectively.

That which is claimed is:

1. An assembly for use in an electronic device comprising:
    an optical device having rounded edges and a flat upper surface; and
    a housing device comprising
        a receiving section configured to receive said optical device, said receiving section comprising
            a receiving surface having first and second openings defined therein,
            a wall along an outer contour of said receiving surface and extending outwardly therefrom, the wall having rounded edges to match the rounded edges of said optical device, and
            at least one first and at least one second vertical registration feature spatially associated with the first and second openings, respectively, for aligning said optical device with said housing device so that the flat upper surface of said optical device is flush with an upper surface of said wall.

2. The assembly of claim 1, wherein said at least one first vertical registration feature comprises a projection extending from the receiving surface of said receiving section.

3. The assembly of claim 1, wherein said at least one first and said at least one second vertical registration features each comprises a projection extending from the receiving surface of said receiving section.

4. The assembly of claim 1, wherein the receiving surface is a flat surface.

5. The assembly of claim 1, wherein said at least one second vertical registration feature is defined by a recess in the second opening.

6. The assembly of claim 5, wherein said optical device comprises a projection to be received by said at least one second vertical registration feature.

7. The assembly of claim 1, wherein said housing device has a glue well defined therein.

8. The assembly of claim 7, wherein said glue well and said at least one first vertical registration feature are spaced apart from each other in said receiving section.

9. The assembly of claim 7, wherein the glue well is elevated from the receiving surface of said receiving section.

10. The assembly of claim 7, wherein the glue well extends circumferentially around the receiving surface of said receiving section.

11. The assembly of claim 7, wherein the glue well has a U-shaped cross-section.

12. The assembly of claim 8, wherein the glue well is spaced apart from said at least one first vertical registration feature and said at least one second vertical registration feature in said receiving section.

13. The assembly of claim 1, wherein said housing device has illumination and sensing recesses defined therein; and wherein the first and second openings extend from the illumination and sensing recesses.

14. The assembly of claim 1, wherein said optical device has an optical aperture defined therein and further comprises an aperture stop; and wherein the first opening receives the optical aperture and the second opening of the housing device receives the aperture stop.

15. The assembly of claim 14, wherein the optical aperture and said aperture stop comprise optical aperture and aperture stop projections extending from a main body of said optical device to extend into the first and second opening of said housing device.

16. The assembly of claim 15, wherein the optical aperture and said aperture stop have optical surfaces at an end portion of said optical aperture projection and said aperture stop projection, respectively.

17. The assembly of claim 1, wherein said housing device is integrally formed as a monolithic unit.

18. The assembly of claim 1, wherein the electronic device is configured as at least one of an optical navigation device, a computer apparatus, a portable communications apparatus, and a remote control handset.

19. An assembly comprising:
    an optical device having rounded edges and a flat upper surface; and
    a housing device comprising
        a receiving section configured to receive said optical device, said receiving section comprising
            a receiving surface having first and second openings defined therein,
            a wall along an outer contour of said receiving surface and extending outwardly therefrom, the wall having rounded edges to match the rounded edges of said optical device, and
            at least one first and at least one second vertical registration features spatially associated with the first and second openings, respectively, for aligning said optical device with said housing device so that the flat upper surface of said optical device is flush with an upper surface of said wall,
            said at least one first vertical registration feature comprising a projection extending from the receiving surface of said receiving section,
            said at least one second vertical registration feature defined by a recess in the second opening.

20. The assembly of claim 19, wherein said optical device comprises a projection to be received by said at least one second vertical registration feature.

21. The assembly of claim 19, wherein said housing device has a glue well defined therein.

22. The assembly of claim 21, wherein said glue well and said at least one first vertical registration feature are spaced apart from each other in said receiving section.

23. The assembly of claim 22, wherein the glue well is spaced apart from said at least one first vertical registration feature and said at least one second vertical registration feature in said receiving section.

24. A method of making an assembly comprising:
    forming a housing device comprising a receiving section configured to receive an optical device, the receiving section having first and second openings defined therein along with a glue well defined therein; and
    forming at least one first and at least one second vertical registration feature spatially associated with the first and second openings, respectively, for aligning the optical device with the housing device, with the glue well and the at least one first vertical registration feature being spaced apart from each other in the receiving section.

25. The method of claim 24, wherein the at least one first vertical registration feature comprises a projection extending from a receiving surface of the receiving section.

26. The method of claim 24, wherein the at least one first and the at least one second vertical registration features each comprise a projection extending from a receiving surface of the receiving section.

27. The method of claim 26, wherein the receiving surface is a flat surface.

28. The method of claim 24, wherein the at least one second vertical registration feature is defined by a recess in the second opening.

29. The method of claim 28, wherein the optical device comprises a projection extending therefrom to be received by the at least one second vertical registration feature.

30. The method of claim 24, wherein the glue well is spaced apart from the at least one first vertical registration feature and the at least one second vertical registration feature in the receiving section.

31. The method of claim 24, wherein the glue well is elevated from a receiving surface of the receiving section.

32. The method of claim 24, wherein the glue well extends circumferentially around a receiving surface of the receiving section.

33. The method of claim 24, wherein the glue well has a U-shaped cross-section.

34. The method of claim 24, wherein the housing device has illumination and sensing recesses defined therein; and wherein the first and second openings extend from the illumination and sensing recesses.

35. An assembly for use in an electronic device comprising:
   an optical device; and
   a housing device comprising
      a receiving section configured to receive said optical device, said receiving section having first and second openings defined therein along with a glue well defined therein, and
      at least one first and at least one second vertical registration feature spatially associated with the first and second openings, respectively, for aligning said optical device with said housing device, with the glue well and the at least one first vertical registration feature being spaced apart from each other in said receiving section.

36. The assembly of claim 35, wherein said at least one first vertical registration feature comprises a projection extending from a receiving surface of said receiving section.

37. The assembly of claim 35, wherein said at least one first and said at least one second vertical registration features each comprises a projection extending from a receiving surface of said receiving section.

38. The assembly of claim 37, wherein the receiving surface is a flat surface.

39. The assembly of claim 35, wherein said at least one second vertical registration feature is defined by a recess in the second opening.

40. The assembly of claim 39, wherein said optical device comprises a projection to be received by said at least one second vertical registration feature.

41. The assembly of claim 35, wherein the glue well is spaced apart from said at least one first vertical registration feature and said at least one second vertical registration feature in said receiving section.

42. The assembly of claim 35, wherein the glue well is elevated from a receiving surface of said receiving section.

43. The assembly of claim 35, wherein the glue well extends circumferentially around a receiving surface of said receiving section.

44. The assembly of claim 35, wherein the glue well has a U-shaped cross-section.

45. The assembly of claim 35, wherein said housing device has illumination and sensing recesses defined therein; and wherein the first and second openings extend from the illumination and sensing recesses.

46. The assembly of claim 35, wherein said optical device has an optical aperture defined therein and further comprises an aperture stop; and wherein the first opening receives the optical aperture and the second opening of the housing device receives the aperture stop.

47. The assembly of claim 46, wherein the optical aperture and said aperture stop comprise optical aperture and aperture stop projections extending from a main body of said optical device to extend into the first and second opening of said housing device.

48. The assembly of claim 47, wherein the optical aperture and said aperture stop have optical surfaces at an end portion of said optical aperture projection and said aperture stop projection, respectively.

49. The assembly of claim 35, wherein said housing device is integrally formed as a monolithic unit.

50. The assembly of claim 35, wherein the electronic device is configured as at least one of an optical navigation device, a computer apparatus, a portable communications apparatus, and a remote control handset.

* * * * *